Jan. 20, 1931.    G. E. PARKER ET AL    1,789,448
BRAKE SHOE PIVOT
Original Filed Aug. 8, 1924
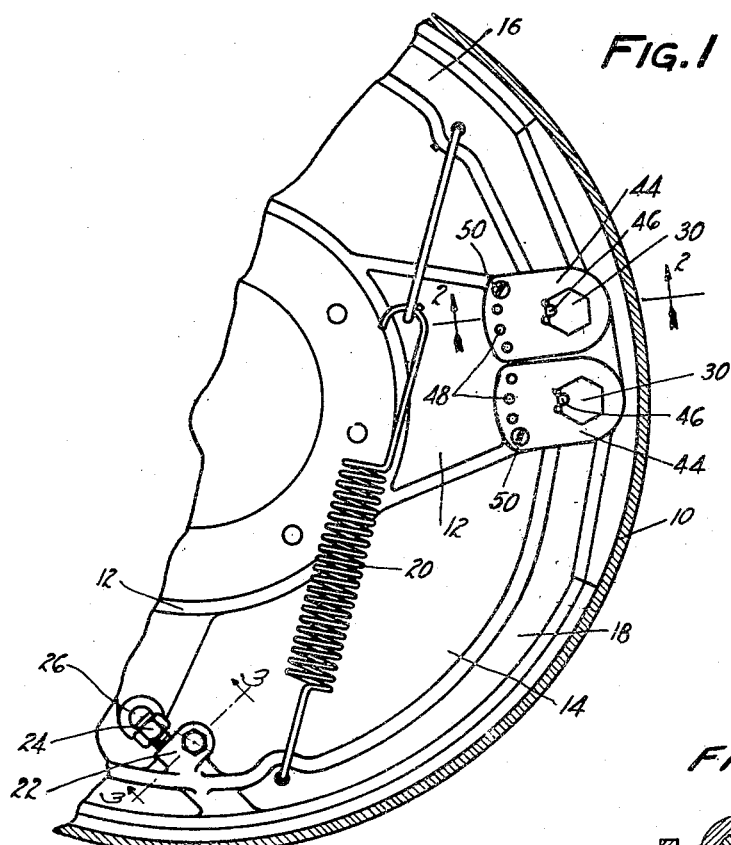
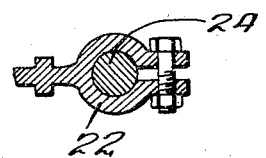
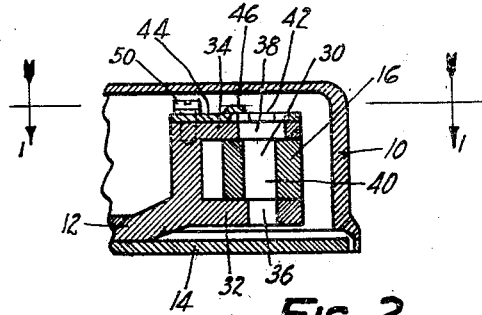
INVENTOR
GUY E. PARKER
ARTHUR H. STAHLHUTH
BY
ATTORNEY Patented Jan. 20, 1931

1,789,448

UNITED STATES PATENT OFFICE

GUY E. PARKER AND ARTHUR H. STAHLHUTH, OF DETROIT, MICHIGAN, ASSIGNORS TO BENDIX BRAKE COMPANY, OF CHICAGO, ILLINOIS, A CORPORATION OF ILLINOIS

BRAKE-SHOE PIVOT

Original application filed August 8, 1924, Serial No. 730,941. Divided and this application filed August 18, 1926. Serial No. 129,958.

This invention relates to brake shoes, and is illustrated as embodied in an internal expanding automobile brake.

One important feature of the invention relates to a novel adjustable pivot mounting for a brake shoe, preferably in the form of an adjustable eccentric on which the shoe is pivoted. In one desirable arrangement an inexpensive part, such as a stamping embracing the head of the pivot, is provided for adjusting the eccentric. This part may also serve to hold the pivot in place. We prefer to mount the pivot in spaced parts straddling the end of the brake shoe.

Other features of novelty relate to a novel adjustable stop carried by the brake shoe, and to other desirable arrangements and constructions of parts which will be apparent from the following description of one illustrative embodiment of the invention shown in the accompanying drawing, in which:

Figure 1 is a partial vertical section through the brake, inside the head of the brake drum, showing parts of the shoes in side elevation; and Figure 2 is a section through one of the pivots, on the line 2—2 of Figure 1.

Figure 3 is a section through the split boss stop structure of Figure 1 taken on the line 3—3 thereof.

The illustrated brake includes a rotatable drum 10 carried by the wheel (not shown), and at the open side of which is arranged a spider or support 12 carrying a backing plate 14. Friction means, such as shoes 16 and 18, is arranged inside the drum, to be forced against the drum by any suitable means (not shown). The shoes are urged away from the drum by a return spring 20.

The particular brake illustrated is fully described, and is claimed in our prior application No. 730,941, filed August 8, 1924, of which the present application is a division.

At the end opposite its pivot, shoe 18 is formed with a threaded split lug 22, in which is adjustably threaded a stop such as a setscrew 24 having a head engaging the flat side of a semi-cylindrical stop or lug 26 carried by the spider 12. Stop 24 is clamped in any desired position of adjustment by a screw 28 contracting the split lug 22. When the brake is not applied, spring 20 holds stop 24 against lug 26.

An important feature of the present invention relates to novel pivots or anchors 30 for shoes 16 and 18; the two pivots being of the same construction.

As best appears in Figure 2, spider 12 is bifurcated to provide parts 32 and 34 straddling the ends of shoes 16 and 18, and formed with openings for the novel pivots 30. Each pivot 30 has a small smooth or unthreaded extension 36 fitting into its opening in part 32, and an enlarged cylindrical head 38 fitting into its opening in part 34, with an intermediate eccentric portion 40 fitting into a cylindrical opening in the shoe end. If preferred, a bushing may be inserted between the eccentric 40 and the shoe.

At its extreme end, beyond the head 38, each pivot 30 is formed with a polygonal flange 42 embraced by a corresponding opening in an adjusting device such as a stamping 44. Each stamping has a tongue 46 engaging the end of its pivot 30, to serve as a retainer preventing axial movement of the pivot, and with an arcuate series of openings 48 for a setscrew 50 threaded into part 34 of the spider 12.

Thus either of the stampings 44 may be turned to adjust the angular position of its eccentric 40, and may be held in any desired angular position by inserting the setscrew 50 in the proper opening 48.

While one illustrative embodiment has been described in detail, it is not our intention to limit the scope of the invention to that particular embodiment, or otherwise than by the terms of the appended claims.

We claim:

1. A brake comprising, in combination, a drum, friction means engageable with the drum and including a brake shoe, an eccentric headed member serving as a fulcrum for the shoe, a sheet metal arm engaging the top and embracing the sides of the head of the fulcrum member, the arm being formed with a plurality of circumferentially arranged openings, and a pin engageable with any one of the openings to hold the eccentric member in any desired position of angular adjustment.

2. A brake comprising, in combination, a brake shoe, an eccentric pivot for the shoe and having a polygonal part, a stamping having a polygonal opening embracing said part and an integral portion engaging the end of the pivot, and means for securing said stamping in various angular positions.

3. A brake having, in combination, a brake shoe having an opening through its end, a member having parts straddling said end and also formed with openings, and a pivot having smooth unthreaded portions at its ends in the openings in said parts and having an intermediate smooth unthreaded eccentric portion in the opening in the brake shoe, one of the end pivot portions being smaller and the other larger than the eccentric intermediate portion, so that the pivot is prevented from moving axially in one direction, together with means engaging the larger end of the pivot to prevent axial movement in the opposite direction.

4. A brake having, in combination, a brake shoe having an opening through its end, a member having parts straddling said end and also formed with openings, and a pivot having smooth unthreaded portions at its ends in the openings in said parts and having an intermediate smooth unthreaded eccentric portion in the opening in the brake shoe, one of the end pivot portions being smaller and the other larger than the eccentric intermediate portion, so that the pivot is prevented from moving axially in one direction, together with an adjusting device engaging the larger end of the pivot to prevent axial movement in the opposite direction and movable to adjust the angular position of the eccentric portion of the pivot.

5. An adjusting device comprising a stamping 44 having a polygonal opening, a tongue 46 opposite said opening, and a series of openings 48 arranged in an arc whose center is at the center of the polygonal opening.

6. A brake shoe having one end arranged to engage a pivot, mounted on a support member, and having near its other end on its inner face an inwardly facing split boss, a stop threaded into said boss, and a clamp screw for contracting the boss on the stop in combination with a semi-cylindrical stop member mounted on said support member and contacting said first-mentioned stop.

7. A brake comprising, in combination, a support provided with a semi-cylindrical stop, a brake shoe having one end arranged to engage a pivot, and having on its inner face a stop adjustable inwardly of the shoe and constructed and arranged to contact said first mentioned stop.

In testimony whereof, we have hereunto signed our names.

GUY E. PARKER.
ARTHUR H. STAHLHUTH.